(12) United States Patent
Molin et al.

(10) Patent No.: US 10,337,956 B2
(45) Date of Patent: Jul. 2, 2019

(54) METHOD OF QUALIFYING WIDE-BAND MULTIMODE FIBER FROM SINGLE WAVELENGTH CHARACTERIZATION USING EMB EXTRAPOLATION, CORRESPONDING SYSTEM AND COMPUTER PROGRAM

(71) Applicant: Draka Comteq B.V., Amsterdam (NL)

(72) Inventors: Denis Molin, Paron (FR); Koen De Jongh, Eindhoven (NL); Marianne Bigot, Paron (FR); Pierre Sillard, Paron (FR)

(73) Assignee: DRAKA COMTEQ B.V., Amsterdam (NL)

( * ) Notice: Subject to any disclaimer, the term of this patent is extended or adjusted under 35 U.S.C. 154(b) by 0 days.

(21) Appl. No.: 15/779,962

(22) PCT Filed: Dec. 17, 2015

(86) PCT No.: PCT/IB2015/002529
§ 371 (c)(1),
(2) Date: May 30, 2018

(87) PCT Pub. No.: WO2017/103639
PCT Pub. Date: Jun. 22, 2017

(65) Prior Publication Data
US 2019/0011633 A1 Jan. 10, 2019

(51) Int. Cl.
*G01M 11/00* (2006.01)
*G02B 6/028* (2006.01)
(Continued)

(52) U.S. Cl.
CPC ........ *G01M 11/338* (2013.01); *G01M 11/335* (2013.01); *G02B 6/0288* (2013.01); *H04B 10/0775* (2013.01); *H04B 10/2581* (2013.01)

(58) Field of Classification Search
None
See application file for complete search history.

(56) References Cited

U.S. PATENT DOCUMENTS 8,483,535 B2 * 7/2013 Molin ................ G02B 6/03666
385/126
9,871,584 B2 * 1/2018 Molin .................. G01M 11/332

FOREIGN PATENT DOCUMENTS

EP 2207022 A1 12/2009
EP 2144096 A1 1/2010
(Continued)

OTHER PUBLICATIONS

Huth et al., "Expansion of the EMBc Calculation to a Complete Fiber Bandwidth Characterization," Proceedings of the 58th IWCS/IICIT, Dec. 31, 2010 (4 pages). (Year: 2010).*

(Continued)

*Primary Examiner* — Jerry Rahll
(74) *Attorney, Agent, or Firm* — Shumaker, Loop & Kendrick, LLP

(57) ABSTRACT

A method of qualifying an effective bandwidth of a multimode optical fiber at a first wavelength $\lambda_1$, using DMD data of the fiber measured a second wavelength $\lambda_2$. Data representative of a Radial Offset Delay, a Radial Offset Bandwidth and a Relative Radial Coupled Power of the fiber are derived from the DMD data at the second wavelength $\lambda_2$. A transformation is performed on the ROD data and ROB data at the second wavelength $\lambda_2$ to obtain corresponding ROD data and ROB data at the first wavelength $\lambda_1$. An effective bandwidth of the fiber at the second wavelength $\lambda_2$ is computed using the ROD data and the ROB data at the first wavelength $\lambda_1$ and the $\tilde{P}_{DMD}$ data at the second wavelength $\lambda_2$.

15 Claims, 7 Drawing Sheets

(51) Int. Cl.
H04B 10/077 (2013.01)
H04B 10/2581 (2013.01)

(56) References Cited

FOREIGN PATENT DOCUMENTS

WO 2015/056044 A1 4/2015
WO 2015/116279 A2 8/2015

OTHER PUBLICATIONS

International Preliminary Report on Patentability for International Patent Application No. PCT/IB2015/002529 dated Jun. 19, 2018 (11 pages).
International Search Report dated Aug. 22, 2016 for International Patent Application No. IB2015/002529 (4 pages).
Written Opinion dated Aug. 22, 2016 for International Patent Application No. IB2015/002529 (10 pages).
Huth et al., "Expansion of the EMBc Calculation to a Complete Fiber Bandwidth Characterization," Proceedings of the 58th IWCS/IICIT, Dec. 31, 2010 (2 pages).
Sengupta, "Calculated Modal Bandwidths of an OM4 Fiber and the Theoretical Challenges," Proceedings of the 58th IWCS/IICIT, Dec. 31, 2009 (3 pages).
Molin et al., "WideBand OM4 Multi-Mode Fiber for Next-Generation 400 Gbps Data Communications," ECOC 2014 (3 pages).
Telecommunications Industry Association Document No. TIA-455-220-A "Differential Mode Delay Measurement of Multimode Fiber in the Time Domain" (34 pages).

* cited by examiner

Fig. 3a
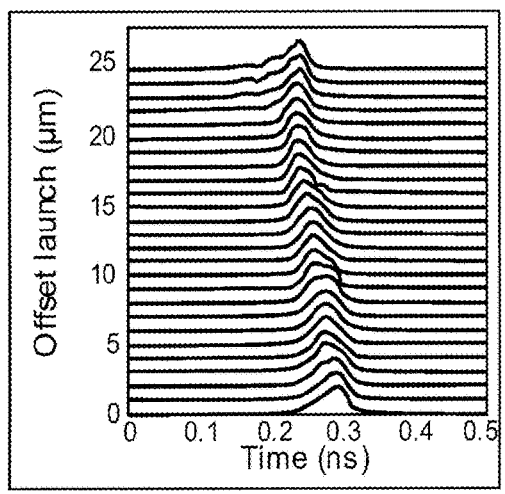
Fig. 3b
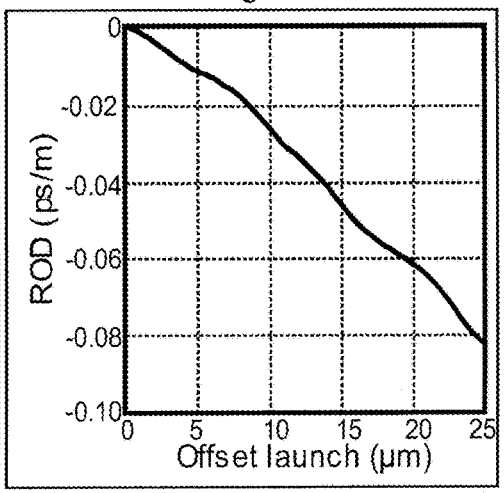
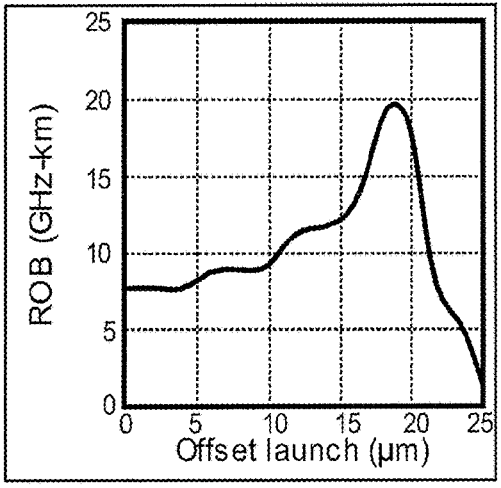
Fig. 3c
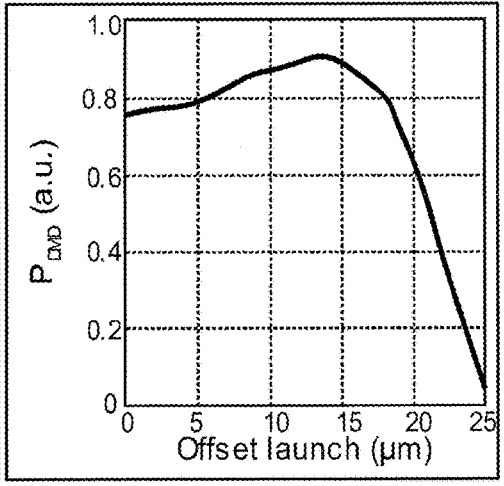
Fig. 3d

METHOD OF QUALIFYING WIDE-BAND MULTIMODE FIBER FROM SINGLE WAVELENGTH CHARACTERIZATION USING EMB EXTRAPOLATION, CORRESPONDING SYSTEM AND COMPUTER PROGRAM

1. FIELD OF THE DISCLOSURE

The present disclosure relates to the field of optical fiber transmissions, and more specifically, to multimode optical fibers used in (relative) long reach and high bitrate systems. More specifically, the present disclosure relates to a method for qualifying the performance of multimode fibers over a wide wavelength range.

2. BACKGROUND

Multimode fibers have constantly evolved from the very beginning of optical communications industry through the recent and on-going explosion of the Ethernet traffic. Enabled by VCSEL technology, high-speed multimode optical fibers, such as OM4 fibers (which are laser-optimized, high bandwidth 50 µm multimode fibers, standardized by the International Standardization Organization in document ISO/IEC 11801, as well as in TIA/EIA 492AAAD standard), have proved to be the medium of choice for high data rate communications, delivering reliable and cost-effective 10 to 100 Gbps solutions. The combination of Wide-Band (WB) multimode fibers with longer-wavelengths VCSELs for Coarse Wavelength Division Multiplexing (CWDM) is an interesting option to be considered in order to meet the future increase of demand. By wide-band multimode fiber, it is meant here, and throughout this document, a multimode fiber having an operational wavelength range larger than 20 nm, for example an operational wavelength range comprised between 850 nm and 950 nm or beyond.

However, the high modal bandwidth of OM4 fibers has until now only been achieved over a narrow wavelength range (typically 850 nm+/−2 nm, or 850 nm+/−10 nm). The feasibility of Wide-Band (WB) multimode fibers satisfying OM4 performance requirements over a broader wavelength range is a challenge to overcome for next generation multimode systems.

The OM4 fiber performance is usually defined by an Effective Modal Bandwidth (EMB) assessment at a given single wavelength. For instance, OM4 fibers should exhibit EMB larger than 4,700 MHz-km at a wavelength of 850 nm. The achievement of such high EMB values requires an extremely accurate control of refractive index profile of multimode fibers. Up to now, traditional manufacturing process cannot guarantee so high EMB, and generally it is hard to accurately predict the EMB values from refractive index profile measurements on core rod or cane, especially when high EMB (typically larger than 2,000 MHz-km) are expected, meaning the fiber refractive index profile is close to the optimal profile. As a matter of fact, EMB are directly assessed on fibers.

In order to minimize modal dispersion, the OM4 fibers generally comprise a core showing a refractive index that decreases progressively going from the center of the fiber to its junction with a cladding. In general, the index profile is given by a relationship known as the "α profile", as follows:

$$n(r) = n_0 \sqrt{1 - 2\Delta\left(\frac{r}{a}\right)^\alpha} \text{ for } r \le a,$$

where:
- $n_0$ is a refractive index on an optical axis of a fiber;
- r is a distance from the optical axis;
- a is a radius of the core of the fiber;
- $\Delta$ is a non-dimensional parameter, indicative of an index difference between the core and a cladding of the fiber; and
- α is a non-dimensional parameter, indicative of the general shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength.

Hence, the Alpha parameter (α) that governs the shape of this graded-index core can be tuned to maximize the modal bandwidth at 850 nm of OM4 multimode fiber, the typical operating wavelength of high-speed data communications. A given alpha parameter value is generally selected to offer an optimum EMB as illustrated in document "*WideBand OM4 Multi-Mode Fiber for Next-Generation 400 Gbps Data Communications*" by Molin et al. ECOC 2014.

The Effective Modal Bandwidth (EMB) is assessed by a measurement of the delays due to the modal dispersion, known under the acronym DMD for "Dispersion Modal Delay". The DMD measurement consists in recording pulse responses of the multimode fiber for single-mode launches that radially scan the core. It provides an accurate cartography of the modal dispersion of the multimode fiber, called the DMD plot, that is then post-processed in order to assess the minimal EMB a fiber can deliver at a given wavelength. The DMD measurement procedure has been the subject of standardization (IEC 60793-1-49 and FOTP-220) and is also specified in *Telecommunications Industry Association Document no. TIA*-455-220-*A*. Each DMD metric, or DMD value, is expressed in units of picoseconds per meter (ps/m) so that the total delay is normalized by fiber length. It determines the delay between the fastest and the slowest pulses traversing the fiber considering a collection of offset launches normalized by fiber length. It basically assesses a modal dispersion. Low DMD value, i.e. low modal dispersion as measured by DMD, generally results in higher EMB.

Basically, a DMD graphical representation is obtained by injecting a light pulse having a given wavelength at the center of the fiber and by measuring the pulse delay after a given fiber length L, the introduction of the light pulse of a given wavelength being radially offset to cover the entire core of the multimode fiber. Individual measurements are thus repeated at different radial offset values so as to provide cartography of the modal dispersion of the examined multimode fiber. The results of these DMD measurements are then post-processed to determine an effective transfer function of the optical fiber, from which a value of EMB may be determined.

Nowadays, all multimode fiber manufacturers perform DMD measurements and EMB assessment, at a single wavelength only, of their whole production: typically at 850 nm+/−2 nm for OM4 qualification and at 850 nm+/−10 nm for OM3 qualification.

With the advent of new multimode fiber applications, requiring high EMB over a wide operating window, one of the main concerns of the multimode fiber manufacturers is to have the ability to easily assess the EMB over a wide wavelength range, for example between 850 nm and 950 nm or beyond.

Using the aforesaid classical measurement procedure (comprising a series of DMD measurements and an EMB assessment at a single wavelength) to assess the optical fiber's EMB over a range of wavelengths, i.e. at a plurality of wavelengths, would require performing several measurement procedures at said wavelengths adequately spread over the wavelength range of interest. However, making distinct independent DMD measurements to qualify the optical fiber's EMB at multiple wavelengths shows several drawbacks:

first, it would imply building new test beds at the manufacturer's plant, each test bed being dedicated to a light source emitting at a given wavelength. This would represent a complex and costly operation.

Then, it would greatly increase measurement time of the manufactured multimode fibers. Keeping on measuring the whole production of multimode fibers would thus greatly increase the production cost of the fibers. Alternately, manufacturers could decide to measure only part of their production, in order to maintain production costs at an adequate level, but this would lead to a decrease in the quality of the sold fibers.

An interesting option would be to limit these measurements to fibers that are the most likely to fulfill such a wide band EMB requirement. Actually, it would allow reducing the wasted measurement time spent on measuring low bandwidth fibers.

To this purpose, in "Expansion of the EMBc Calculation to a Complete Fiber Bandwidth Characterization", Proc. 58th Internat. Wire & Cable Sumposium (IWCS'09), Charlotte, N.C., USA, 2009, Andreas Huth and Harald Hein disclose a technique for predicting the overfilled launch bandwidth (OFLBW) of fibers at 1300 nm using only DMD measurements at 850 nm. Such a technique relies on a transformation of the DMD plot. Actually, the authors have observed a relation between the DMD measurement results of a fiber at different wavelengths, and have derived from these observations a transformation function, in the form of a shift, allowing them to predict the DMD plot of a fiber at 1300 nm, knowing the DMD plot of the fiber at 850 nm.

3. SUMMARY

According to an embodiment of the present disclosure, a method of qualifying an effective bandwidth of a multimode optical fiber at a first wavelength $\lambda_1$ is disclosed, comprising:

obtaining DMD data using a measurement of dispersion modal delay (DMD) carried out on said multimode optical fiber at a second wavelength $\lambda_2$, said DMD data comprising a plurality of traces recorded at different radial offset values r, from an axis of said multimode optical fiber where r=0 to a radial offset value r=a, where a is the core radius of said multimode optical fiber.

Such a method also comprises:

determining, from said DMD data at said second wavelength $\lambda_2$:

Data representative of a Radial Offset Delay of said multimode optical fiber, called ROD data, as a function of said radial offset value r, $0 \leq r \leq a$;

Data representative of a Radial Offset Bandwidth of said multimode optical fiber, called ROB data, as a function of said radial offset value r, $0 \leq r \leq a$;

Data representative of a Relative Radial Coupled Power of said multimode optical fiber, called $\tilde{P}_{DMD}$ data, as a function of said radial offset value r, $0 \leq r \leq a$;

performing a transformation on the ROD data and ROB data at said second wavelength $\lambda_2$ to obtain corresponding ROD data and ROB data at said first wavelength $\lambda_1$;

computing an effective bandwidth of said multimode optical fiber at said first wavelength $\lambda_1$, comprising calculating a transfer function using said ROD data and said ROB data at said first wavelength $\lambda_1$ and said $\tilde{P}_{DMD}$ data at said second wavelength $\lambda_2$.

The present disclosure thus relies on a new and inventive approach for qualifying the effective bandwidth of multimode optical fibers at a wavelength at which no measurement has been carried out on the fibers. Actually, the present disclosure allows assessing the effective bandwidth of the fiber at a first wavelength $\lambda_1$, only on the basis of DMD measurement data obtained at a second wavelength $\lambda_2$. It hence helps achieving great savings as regards measurement times for the fiber's manufacturer, as there is no need anymore to perform DMD measurements at the first wavelength $\lambda_1$ for all manufactured multimode optical fibers.

The manufacturer may use the computed effective bandwidth of the fibers at the first wavelength $\lambda_1$ to select those of the fibers which are the most likely to show interesting features and performance at $\lambda_1$, and to carry out actual DMD measurements (or any other performance measurements) at this first wavelength, only for these selected fibers.

The method according to the present disclosure is much faster and cheaper than actual measurements, which are most of the time practically unachievable, as they require too much time and resources. It is not limited to any wavelength range, nor to any peculiar type of multimode optical fibers. It is actually well suited to 50 μm graded-index multimode fibers, but can also be applied to smaller core diameters from 10 μm to 50 μm or larger core diameters from 50 μm to 100 μm for instance. It is not either limited to graded-index multimode fibers, but is particularly suited to any fiber sustaining more than one mode at the operating wavelengths of interest.

The method of the present disclosure allows qualifying the Effective Modal Bandwidth (EMB) of multimode fibers over a wide wavelength range (e.g. 850-950 nm) while the actual measurement procedure is restricted to a narrow wavelength range (e.g. 850+/-2 nm), thanks to an adequate post-processing of the measurement results obtained at a single wavelength (e.g. 850 nm) to guarantee marge modal bandwidth over a wider spectrum (e.g. 850-950 nm).

According to an embodiment, performing a transformation on the ROD data at said second wavelength $\lambda_2$ to obtain said corresponding ROD data at said first wavelength $\lambda_1$ comprises applying the following linear function:

$$ROD_r(\lambda_1) = p_{1,r}^{\lambda_2 \to \lambda_1} \cdot ROD_r(\lambda_2) + p_{2,r}^{\lambda_2 \to \lambda_1},$$

where $p_{1,r}$ and $p_{2,r}$ are scalars.

Experimental results have actually shown that the relationship between the ROD data at a first wavelength and the ROD data at a second wavelength can be fairly approximated by a linear relationship, and allow deriving the values of the coefficients $p_{1,r}$ and $p_{2,r}$. Usually, $p_{1,r}^{\lambda_2 \to \lambda_1}$ is of the same sign as $\lambda_1 - \lambda_2$.

According to an embodiment, performing a transformation on the ROB data at said second wavelength $\lambda_2$ to obtain said corresponding ROB data at said first wavelength $\lambda_1$ comprises applying the following formula:

$$ROB_r(\lambda_1) = p_{00,r}^{\lambda_2 \to \lambda_1} + p_{10,r}^{\lambda_2 \to \lambda_1 21} \cdot ROB_r(\lambda_2) + p_{01,r}^{\lambda_2 \to \lambda_1} \cdot \frac{dROD_r}{dr}(\lambda_2) +$$

-continued $$p_{11,r}^{\lambda_2 \to \lambda_1} \cdot ROB_r(\lambda_2) \cdot \frac{dROD_r}{dr}(\lambda_2) + p_{02,r}^{\lambda_2 \to \lambda_1} \cdot \left[\frac{dROD_r}{dr}(\lambda_2)\right]^2,$$

where $p_{00,r}$, $p_{10,r}$, $p_{01,r}$, $p_{11,r}$ and $p_{02,r}$ are scalars.

The ROB transformation is less straightforward than the ROD transformation. However, the inventors have assessed that the ROB(r) data at $\lambda_1$ can be linked to the ROB(r) data at $\lambda_2$ and the derivative of ROD(r) data at $\lambda_2$ with respect to the radius. Such a relationship linking the ROB and the ROD allows for a greater accuracy of the assessment of the performance of the fiber, as compared to prior art methods.

According to a further embodiment, $$\frac{dROD_r}{dr}(\lambda_2) = ROD_r(\lambda_2) - ROD_{r-1\mu m}(\lambda_2) \text{ for } r > 1 \ \mu m \text{ and } \frac{dROD_r}{dr}(\lambda_2) = 0 \text{ for } r < 1 \ \mu m.$$

Such approximations are useful for sake of simplicity.

According to an embodiment, computing said effective bandwidth of said multimode optical fiber at said first wavelength $\lambda_1$ comprises calculating a transfer function $\tilde{H}(f)$, where:

$$\tilde{H}(f) = \sum_{r=0}^{r=a} W(r) \cdot \tilde{P}_{DMD}(r) \cdot e^{-i2\pi(\widetilde{\Delta\tau}_{DMD}(r))f} \cdot e^{-\left(\frac{1}{\tilde{\sigma}_{DMD}(r)^2}\right)f^2}$$

with:

$$\widetilde{\Delta\tau}_{DMD}(r) = L \cdot ROD(r)$$

$$\frac{1}{\tilde{\sigma}_{DMD}(r)^2} = \left(\frac{L \cdot \sqrt{0.3 \log_e 10}}{ROB(r)}\right)^2$$

where
W(r) is a weight function, with $\Sigma_{r=0}^{r=a} W(r) \geq 0$ and $W(r) \geq 0$ at any r, and
L is the length of said multimode fiber.

According to an embodiment, computing said effective bandwidth of said multimode optical fiber at said first wavelength $\lambda_1$ comprises calculating a transfer function $\tilde{H}(f)$, where:

$$\tilde{H}(f) = \sum_{r=0}^{r=a} P_{source}(r) \cdot \tilde{P}_{DMD}(r) \cdot OMBc(r) \cdot e^{-i2\pi(\widetilde{\Delta\tau}_{DMD}(r))f} \cdot e^{-\left(\frac{1}{\tilde{\sigma}_{DMD}(r)^2}\right)f^2}$$

with:

$$\widetilde{\Delta\tau}_{DMD}(r) = L \cdot ROD(r)$$

$$\frac{1}{\tilde{\sigma}_{DMD}(r)^2} = \left(\frac{L \cdot \sqrt{0.3 \log_e 10}}{ROB(r)}\right)^2$$

where
$P_{source}(r)$ is a function representative of the output power of a source as a function of a radial offset value r of a single mode fiber at the output of said multimode optical fiber, with $\Sigma_{r=0}^{r=a} P_{source}(r) \geq 0$ and $P_{source}(r) \geq 0$ at any r,
L is the length of said multimode fiber,
and OMBc(r) is the OMBc (for "Overfilled Modal Bandwidth calculated") weight function.

The OMBc weight functions are the weight functions disclosed in "*Calculated Modal Bandwidths of an OM4 Fiber and the Theoretical Challenges*" by Abhijit Sengupta, *International Wire & Cable Symposium, Proceedings of the 58th IWCS/IICIT*, pp. 24-29.

$P_{source}(r)$ are the weight functions of the VCSEL multimode transverse sources. Actually, the computed effective bandwidth is in fact the effective bandwidth of the multimode optical fiber link, comprising a light source and one or several multimode fibers. Some source parameters, such as the output power of the source $P_{source}(r)$, influence the computation of the effective bandwidth of the link, and must be taken into account in the above formula. More information on this source parameter may be found in patent document WO2015056044 in the name of the present Applicant.

According to a further embodiment, said effective bandwidth of said multimode optical fiber is a −3 dB bandwidth of said $\tilde{H}(f)$ transfer function (according to any of the two above formulas). Of course, other ways of deriving EB from $\tilde{H}(f)$ could be used, such as by using a −1.5 dB threshold and multiplying the obtained bandwidth by $\sqrt{2}$, or by using a −6 dB threshold for example.

According to yet a further embodiment, said first wavelength $\lambda_1$=950 nm and said second wavelength $\lambda_2$=850 nm. Actually, nowadays, most multimode transmissions are carried out at 850 nm, while the advent in the coming years of wavelength division multiplexing (WDM) will require having multimode fibers showing good performance at 950 nm as well. However, the present disclosure is not restricted to this peculiar wavelengths, and also finds application in assessing the performance at 1050 nm of a fiber knowing its performance at 850 nm, or assessing the performance at 1050 nm of a fiber knowing its performance at 950 nm, or more generally assessing the performance of a fiber at any given wavelength knowing its performance at any other wavelength.

The present disclosure also concerns a computer program product downloadable from a communication network and/or recorded on a medium readable by a computer and/or executable by a processor, comprising program code instructions for implementing a method as described previously.

The present disclosure also concerns a non-transitory computer-readable medium comprising a computer program product recorded thereon and capable of being run by a processor, including program code instructions for implementing a method as described previously.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The present disclosure also concerns a method of selecting at least one multimode optical fiber, which is likely to meet a first performance criterion at a first wavelength $\lambda_1$, comprising:

selecting a set of multimode optical fibers meeting a second performance criterion at a second wavelength $\lambda_2$;

qualifying an effective modal bandwidth of said set of multimode optical fibers in compliance with the method of any of claims 1 to 7, delivering an effective bandwidth of said set of multimode optical fibers at said first wavelength $\lambda_1$;

on the basis of said effective bandwidth at said first wavelength $\lambda_1$, assessing, for each multimode optical fiber in said set, a probability that said multimode optical fiber fulfills said performance criterion at the first wavelength $\lambda_1$;

selecting in said set at least one multimode optical fiber, which probability is higher than a probability threshold.

Hence, the measurements required for assessing the EMB of multimode optical fibers are limited to fibers that are the most likely to fulfill such a wide band EMB requirement, and the wasted measurement time spent in measuring low bandwidth fibers is strongly reduced. Such a probability threshold may be set and revised as a function of the manufacturer's measurement capacity at a given time. It may for example be chosen in the range [50%; 90%].

According to an embodiment, said second performance criterion is that the Effective Modal Bandwidth at a second wavelength $\lambda_2$=850 nm is equal or higher than 4,700 MHz-km, and said first performance criterion is that the Effective Modal Bandwidth at a first wavelength $\lambda_1$=950 nm is equal or higher than 2,700 MHz-km.

Hence, the selected fibers are wide-band multimode fibers with OM4 performance over the wavelength [850 nm; 950 nm].

The present disclosure also concerns a system for selecting at least one multimode optical fiber, which is likely to meet a first performance criterion at a first wavelength $\lambda_1$, comprising:

a bench bed configured for selecting a set of multimode optical fibers meeting a second performance criterion at a second wavelength $\lambda_2$;

a processor configured for:
qualifying an effective modal bandwidth of said set of multimode optical fibers in compliance with the previously described method, delivering an effective bandwidth of said set of multimode optical fibers at said second wavelength $\lambda_2$;

on the basis of said effective bandwidth at said first wavelength $\lambda_1$, assessing, for each multimode optical fiber in said set, a probability that said multimode optical fiber fulfills said performance criterion at the first wavelength $\lambda_1$;

selecting in said set at least one multimode optical fiber, which probability is higher than a probability threshold.

The present disclosure also concerns a computer program product downloadable from a communication network and/or recorded on a medium readable by a computer and/or executable by a processor, comprising program code instructions for implementing a method for selecting at least one multimode optical fiber as described previously.

The present disclosure also concerns a non-transitory computer-readable medium comprising a computer program product recorded thereon and capable of being run by a processor, including program code instructions for implementing a method for selecting at least one multimode optical fiber as described previously.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

The invention can be better understood with reference to the following description and drawings, given by way of example and not limiting the scope of protection, and in which:

FIG. 1 shows an example of an optical communication system implementing a multimode optical fiber;

FIG. 2 provides a schematic illustration of the DMD measurement technique;

FIG. 3a shows an example of DMD plot resulting from a DMD measurement for a multimode fiber characterized according to an embodiment of the invention;

FIG. 3b illustrates the ROD curve derived from the DMD plot of FIG. 3a;

FIG. 3c illustrates the ROB curve derived from the DMD plot of FIG. 3a;

FIG. 3d illustrates the $P_{DMD}$ curve derived from the DMD plot of FIG. 3a;

Figure 6:
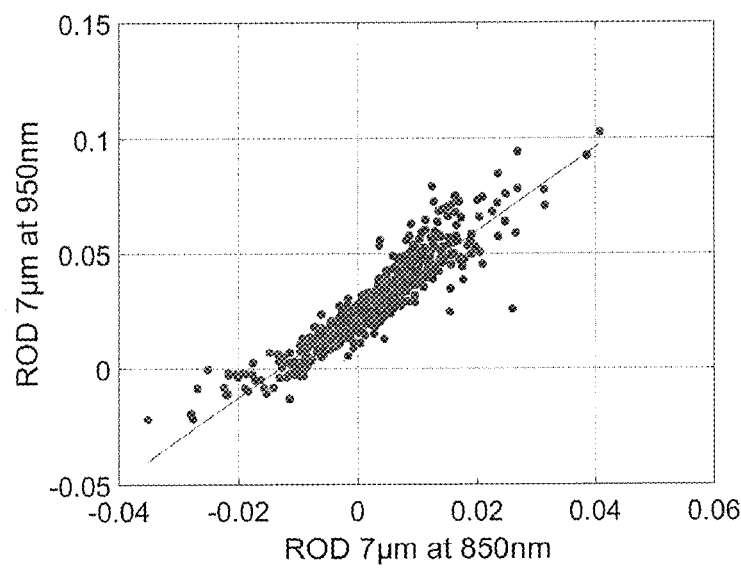
Figure 5:
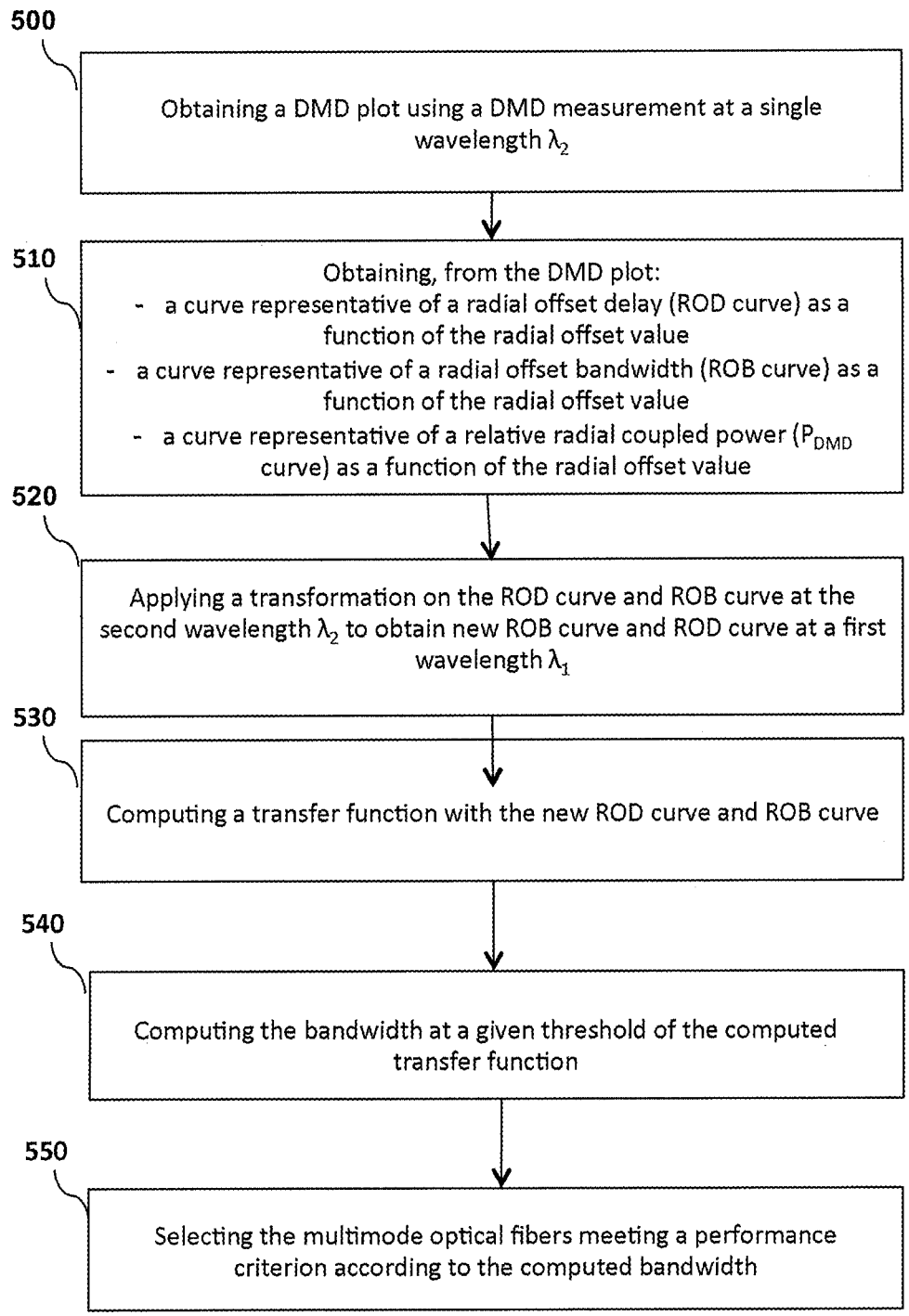
Figure 7:
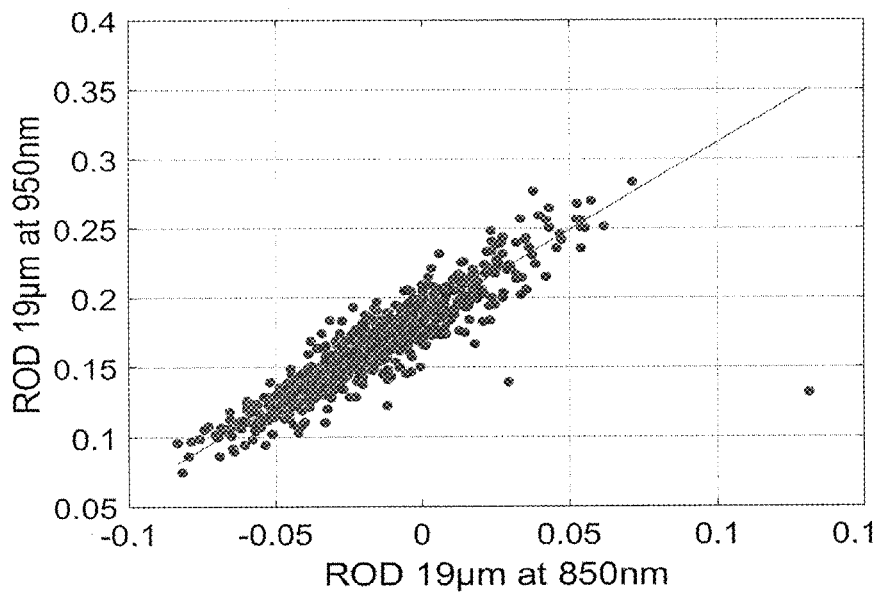
Figure 8:
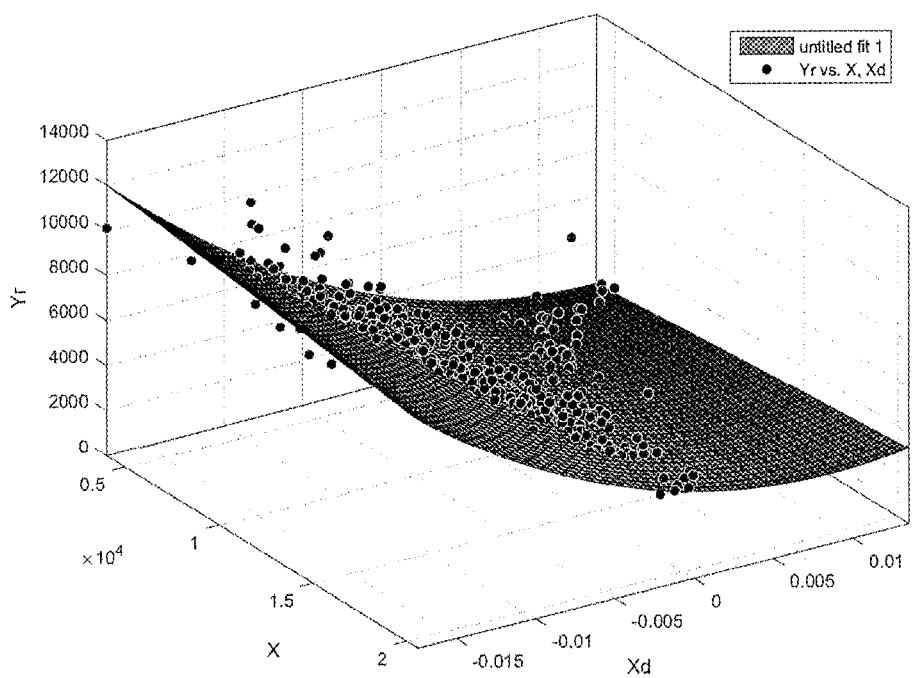
Figure 9:
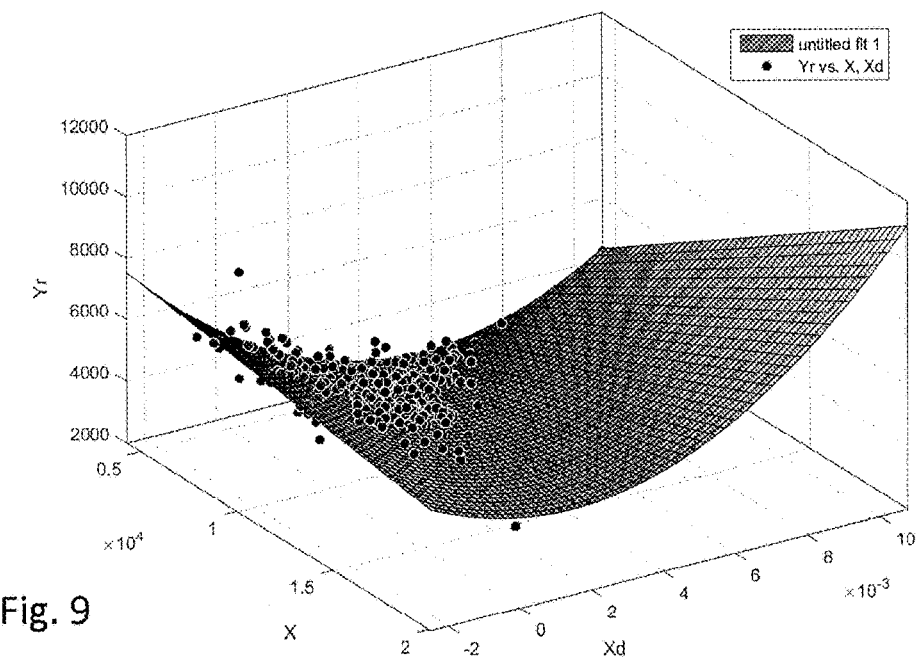
Figure 10:
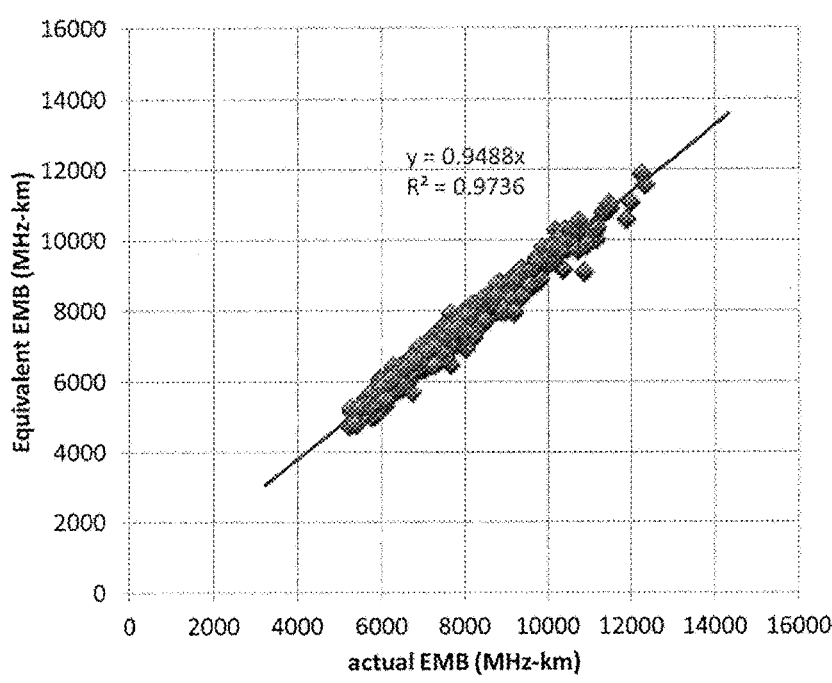
Figure 11:
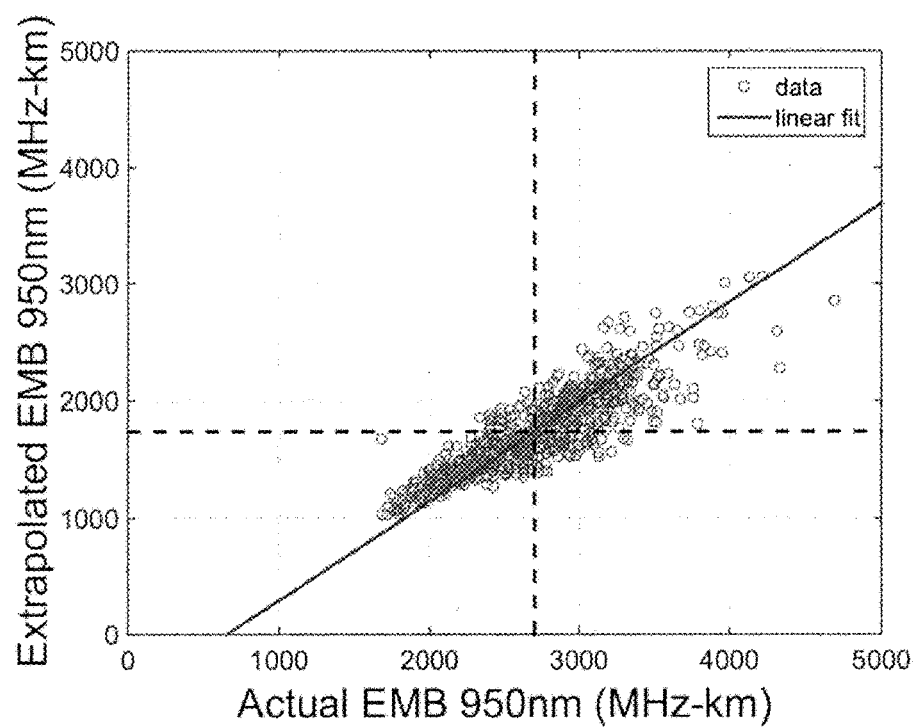
Figure 12:
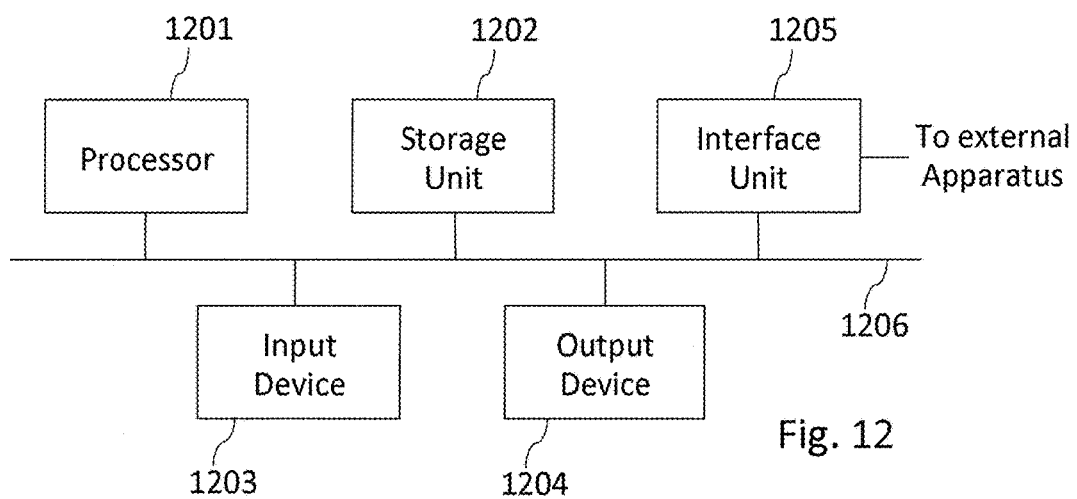

FIG. 5 provides a flowchart of a particular embodiment of the method of qualifying and selecting fibers according to the invention;

FIG. 6 shows the relationship between the ROD data of a tens of fibers measured at both $\lambda_2$=850 nm and $\lambda_1$=950 nm for a radial offset launch r=7 µm;

FIG. 7 shows the relationship between the ROD data of a tens of fibers measured at both $\lambda_2$=850 nm and $\lambda_1$=950 nm for a radial offset launch r=19 µm;

FIG. 8 shows the relationship between the $ROB_{19\mu m}$ (950 nm) and both the $ROB_{19\mu m}$ (850 nm) and $ROD_{19\mu m}$ (850 nm)–$ROD_{18\mu m}$ (850 nm) of several 50 µm graded-index multimode fibers;

FIG. 9 is similar to FIG. 8 but for an offset launch r=7 µm;

FIG. 10 illustrates the relationship between the EMB equivalent and the actual EMB calculated from a DMD plot performed at 850 nm of a set of 50 µm graded-index multimode-fibers;

FIG. 11 illustrates the relationship between the equivalent EMB at $\lambda_1$=950 nm computed according to an embodiment of the present disclosure and the actual EMB obtained from actual DMD measurements at $\lambda_1$=950 nm for a batch of multimode optical fibers;

FIG. 12 is a schematic block diagram illustrating parts of a system for selecting multimode optical fibers meeting a given performance criterion, such as OM4 fibers showing an actual EMB at 950 nm higher than 2,700 MHz-km, according to an embodiment of the present disclosure.

The components in the figures are not necessarily to scale, emphasis instead being placed upon illustrating the principles of the invention. On all figures of the present document, a same numerical reference sign always designates the same element or step.

5. DETAILED DESCRIPTION

The general principle of the invention relies on the use of data obtained from a DMD measurement carried out on a multimode optical fiber at a given wavelength (e.g. 850 nm, thereafter called second wavelength) to assess the performance of this multimode optical fiber at another wavelength (e.g. 950 nm, thereafter called first wavelength). Such an assessment is achieved thanks to a transformation of the ROB data and ROD data at the second wavelength, in order to get corresponding ROB data and ROD data at the first wavelength, and to a computation of the extrapolated effective bandwidth of the multimode optical fiber at the first wavelength on the basis of these transformed ROB and ROD data.

The method according to embodiments of the present disclosure described here below applies to OM4 multimode optical fibers of core diameter of 50 µm. The invention of course is not limited to this particular application and can be applied to any other kind of multimode fibers.

Figure 1:
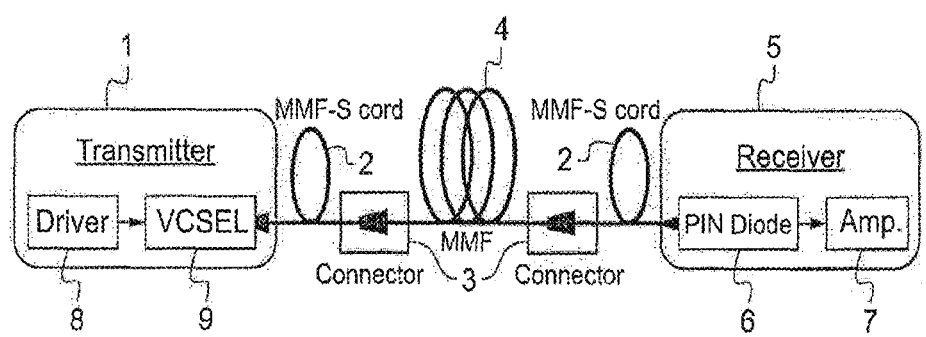

FIG. 1 shows an example of an optical communication system including a multimode fiber, object of the present effective bandwidth computing method. A multi Gigabits Ethernet optical communication system successively comprises a driver 8 of a transmitter 1, a VCSEL source 9 of a transmitter 1, a launch cord 2, a connector 3, a multimode optical fiber 4, a connector 3, a launch cord 2, a PIN diode 6 of a receiver 5, an amplifier 7 of a receiver 5. A digital signal at 10 Gbps or 25 Gbps or more is generated by the driver 8, which directly modulates the VCSEL source 9.

The multimode optical fiber 4 is characterized, according to embodiments of the invention, based on the DMD measurements, as described in the standard TIA FOTP-220 or IEC 60793-1-49 (TIA-455-220-A, "Differential Mode Delay Measurement of Multimode Fiber in the Time Domain" (January 2003)).

Figure 2:
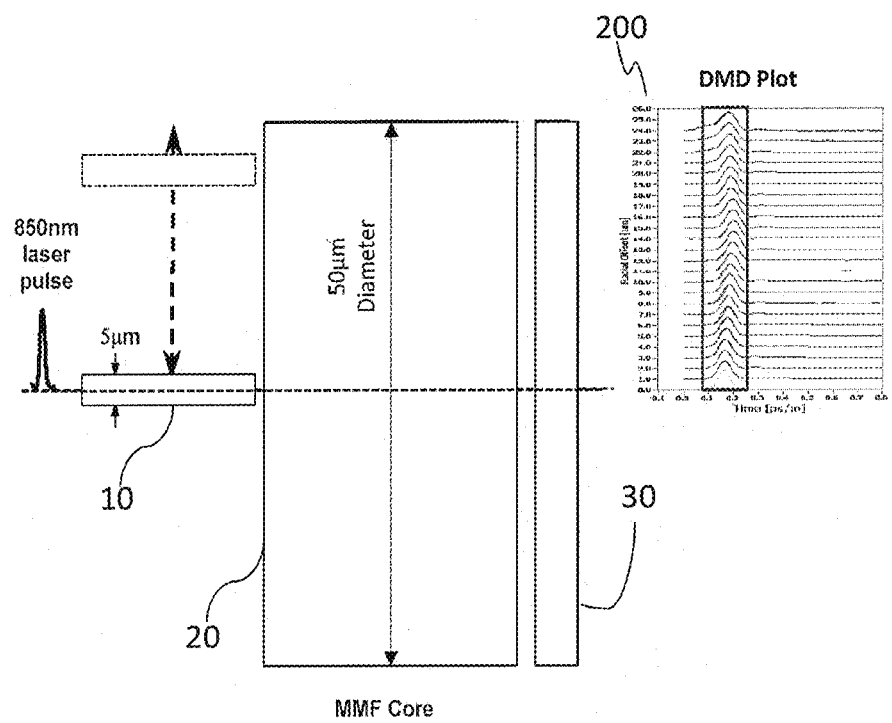

FIG. 2 illustrates the DMD measurement technique. An ultrafast laser pulse is launched into a multimode fiber MMF using a single mode fiber SMF. The SMF is scanned radially, and for each radial offset position ("offset launch"), the shape of the transmitted pulse is recorded using a high bandwidth optical receiver 30 and a sampling oscilloscope.

More precisely, an optical reference pulse $s_r(t)$ at 850 nm is emitted by a source and launched into the core 10 of a single-mode launch fiber SMF, with a core diameter of 5 µm. From the end of the SMF, it is stepped across the core 20 of a multimode fiber MMF under test. Such a MMF has typically a core diameter of 50 µm. For each lateral offset across the core (0 to 24 microns), the propagation delay of the resultant output pulse is recorded. Each output pulse contains only those modes excited at a given input radial position. The output waveforms for each of the radial offsets are plotted along the vertical axis and are displaced by 1-micron increments, as shown on the right part of FIG. 2, also called a DMD plot. The relative pulse delay for each waveform is plotted along the horizontal axis in units of picoseconds per meter (ps/m). The DMD is determined by first measuring the difference pulse in delay using the leading edge of the fastest pulse and the trailing edge of the slowest pulse. From this difference we subtract the temporal width of the launch pulse, which yields the modal dispersion of the fiber.

The example of DMD plot 200 illustrated on FIG. 2 shows a set of twenty-four recorded traces, each trace corresponding to a DMD measurement carried out for a given radial offset value r with respect to the optical core's center.

FIG. 5 illustrates a flowchart of a particular embodiment of the selecting method according to the invention.

Take a batch of multimode optical fibers at outlet of production. The multimode fibers have a standard radius of 25 µm (±1.25 µm). In this peculiar embodiment, the aim of the method is to select, among the batch of tested fibers, those that satisfy OM4 standard criterion and have a high probability to exhibit an Effective Modal Bandwidth (EMB) equal or higher than, for example, 2,700 MHz-km at a wavelength of 950 nm.

Figure 4:
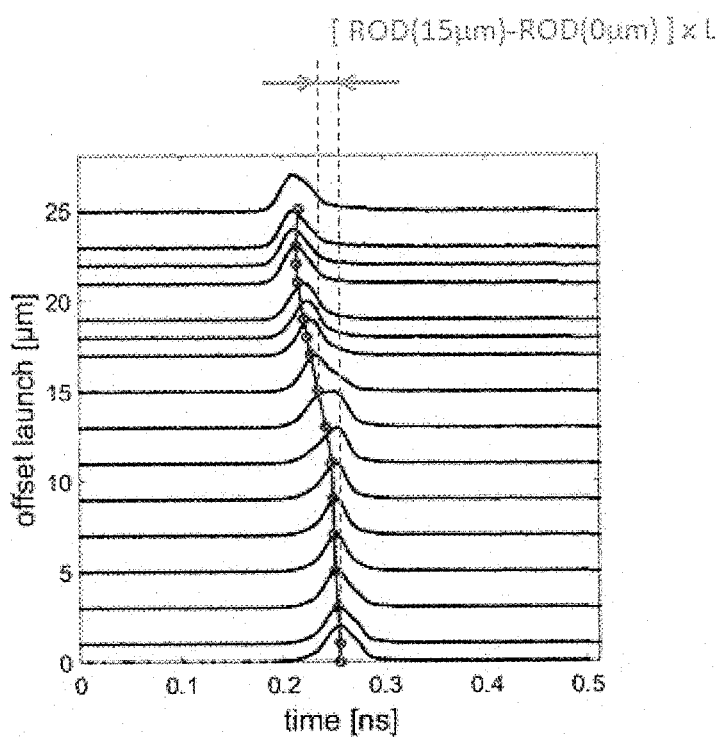
FIG. 4 depicts an example of a DMD graphical representation obtained for a multimode optical fiber, illustrating the calculation of a ROD curve according to a particular embodiment of the invention.

At step 500, a DMD measurement is carried out on each of the multimode fibers at a wavelength of 850 nm ($\lambda_2$), as set forth in the FOTP-220 standard, and as described previously in relation to FIG. 2. At the end of this step, a DMD plot for each tested fiber is obtained. FIG. 4 shows an example of DMD plot obtained for a given fiber of the batch of tested fibers: x-axis depicts the time in nanoseconds and y-axis depicts the offset launch in micrometers.

The following steps 510 to 540 are executed for each DMD plot obtained, but they are thereafter described for a given DMD plot, for one of the tested fibers (for sake of simplicity).

According to an embodiment of the invention, at step 510, three curves that characterize the multimode fiber 4 of core radius a are calculated from the DMD plot:

a curve showing a Radial Offset Bandwidth ROB (r) of the multimode fiber 4 as a function of the radial offset value r, $0 \leq r \leq a$;

a curve showing a Radial Offset Delay ROD (r) of the multimode fiber 4 as a function of the radial offset value r, 0≤r≤a;

a curve showing a Radial Coupling Power $\tilde{P}_{DMD}(r)$ of the multimode fiber 4 as a function of the radial offset value r, 0≤r≤a, which may be expressed as a relative power.

The Radial Offset Bandwidth is described in several prior art documents, among which patent document EP2207022. As described in this patent document, the radial offset bandwidth ROB(r) is defined as the −3 dB bandwidth of a transfer function:

$$H_r(f) = \frac{1}{L} \cdot \frac{TF[s_r(t)]}{TF[s_{REF}(t)]},$$

where $s_r(t)$ is the trace recorded at the offset launch r in the DMD measurement, i.e. the time profile of the inlet pulse $s_e(t)$, launched in the DMD measurement, $s_{REF}(t)$ is the reference pulse launched at the input of the multimode fiber, L is the sample length of the multimode fiber 4, TF designates the Fourier Transform operator and f indicates frequency.

Therefore, we have: $10 \cdot \log_{10}[H_r(ROB(r))] = -3$.

An interesting characteristic of the ROB is its high sensitivity to localized defects in refractive index. Hence, if the ROB decreases too quickly on increasing the radial offset r, then it is likely that the fiber presents an irregular index profile.

ROB is normalized to the fiber length in the DMD measurement and is generally expressed in MHz·km, or GHz·km.

As regards the ROD, it corresponds to the mean temporal position of the fiber output response for a given delay. In other words, the ROD is the "average" delay of a trace recorded during DMD measurements with respect to the "average" delay of a reference trace. The reference trace may be the trace corresponding to a center launch (i.e. r=0 μm).

The "average" delay can be calculated as the barycenter of the trace as follows:

$$ROD(r) = \frac{1}{L} \cdot \frac{\int_0^T t \cdot s_r(t) \cdot dt}{\int_0^T s_r(t) \cdot dt}$$

where the trace $s_r(t)$ corresponds to the trace recorded at the offset launch r in the DMD measurements, over the [0,T] time window, L is the tested multimode optical length.

The ROD curve is the function $f(r)$ defined as follows:

$$f(r) = ROD(r) - ROD(r_{REF})$$

where $r_{REF}$ is the reference offset value, with $r_{REF}=0$ μm.

ROD is normalized to the fiber length used in the DMD measurements to be expressed typically in ps/m.

The relative radial coupled power $\tilde{P}_{DMD}(r)$ can be calculated by integrating the trace recorded during DMD measurements:

$$\tilde{P}_{DMD}(r) = \int_0^T s_r(t) \cdot dt$$

FIG. 3a illustrates a DMD plot obtained by characterizing a multimode fiber through a DMD measurement technique. FIGS. 3b to 3d show respectively the ROD curve, the ROB curve and the $P_{DMD}$ curve as a function of the radial offset value derived from the DMD plot according to an embodiment of the invention.

FIG. 4 also shows what the radial offset delays ROD are, for a given DMD plot. Each circle materializes the average delay calculated for a given radial offset value. The example illustrated here corresponds to the average offset delay calculated for the DMD trace corresponding to a radial offset of 15 μm.

At step 520, the ROB and ROD data obtained at step 510 at a wavelength of 850 nm ($\lambda_2$) are transformed to obtain new ROB and ROD data at a wavelength of 950 nm ($\lambda_1$).

As regards the ROD curve, the transformation can be achieved by applying the following linear function:

$$ROD_r(\lambda_1) = p_{1,r}^{\lambda_2 \to \lambda_1} \cdot ROD_r(\lambda_2) + p_{2,r}^{\lambda_2 \to \lambda_1},$$

where $p_{1,r}$ and $p_{2,r}$ are scalars. Usually, $p_{1,r}^{\lambda_2 \to \lambda_1}$ is of the same sign as $\lambda_1 - \lambda_2$.

FIG. 6 shows the relationship between the ROD data of a tens of fibers measured at both $\lambda_2$=850 nm and $\lambda_1$=950 nm for a radial offset launch r=7 μm. The x-axis illustrates $ROD_{r=7\mu m}$ (850 nm), while the y-axis depicts $ROD_{r=7\mu m}$ (950 nm).

FIG. 7 shows the relationship between the ROD data of a tens of fibers measured at both $\lambda_2$=850 nm and $\lambda_1$=950 nm for a radial offset launch r=19 μm. The x-axis illustrates $ROD_{r=19\mu m}$ (850 nm), while the y-axis depicts $ROD_{r=19\mu m}$ (950 nm).

As may be observed on both FIGS. 6 and 7, the relationship between the measured ROD values at two distinct wavelengths for a same offset launch may be fairly approximated by a linear relationship (illustrated by the continuous line on both figures), which confirms the above transformation formula. The values of the $p_{1,r}$ and $p_{2,r}$ scalars may be easily derived from the measurements illustrated by FIGS. 6 and 7, $p_{1,r}$ corresponding to the slope of the continuous line, and $p_{2,r}$ corresponding to the value of ROD (950 nm) when $ROD_r$ (850 nm)=0.

As regards transforming the ROB data, it is less straightforward than the ROD transformation. However, the inventors have assessed that the ROB(r) data at $\lambda_1$ can be linked to the ROB(r) data at $\lambda_2$ and the derivative of ROD(r) data at $\lambda_2$ with respect to the radius.

At step 520, the following formula is hence applied on the ROB data at 850 nm to get the ROB data at 950 nm:

$$ROB_r(\lambda_1) = p_{00,r}^{\lambda_2 \to \lambda_1} + p_{10,r}^{\lambda_2 \to \lambda_2 1} \cdot ROB_r(\lambda_2) + p_{01,r}^{\lambda_2 \to \lambda_1} \cdot \frac{dROD_r}{dr}(\lambda_2) + p_{11,r}^{\lambda_2 \to \lambda_1} \cdot ROB_r(\lambda_2) \cdot \frac{dROD_r}{dr}(\lambda_2) + p_{02,r}^{\lambda_2 \to \lambda_1} \cdot \left[\frac{dROD_r}{dr}(\lambda_2)\right]^2,$$

where $p_{00,r}$, $p_{10,r}$, $p_{01,r}$, $p_{11,r}$ and $p_{02,r}$ are scalars.

For sake of simplicity, one can approximate the ROD derivative as follows for r>1 μm:

$$\frac{dROD_r}{dr}(\lambda_2) = ROD_r(\lambda_2) - ROD_{r-1\mu m}(\lambda_2).$$

For r<1 μm, one can consider that the derivative is equal to zero:

$$\frac{dROD_r}{dr}(\lambda_2) = 0.$$

FIG. 8 shows the relationship between the $ROB_{19\mu m}$ (950 nm) (on the Yr-axis) and the $ROB_{19\mu m}$ (850 nm) (on the X-axis) and $ROD_{19\mu m}$ (850 nm)-$ROD_{18\mu m}$ (850 nm) (on the Xd-axis) of a tens of 50 μm graded-index multimode fibers. The values are illustrated by dots. The distribution of dots in the (Yr, X, Xd) space may be approximated by a surface ("untitled fit 1"), which corresponds to the previously described model with the following coefficients with the 95% confidence bounds (shown between parenthesis):

p00=5574 (5245, 5904)
p10=−0.09742 (−0.126, −0.06887)
p01=−3.828e+05 (−4.276e+05, −3.379e+05)
p11=−11.12 (−19.57, −2.664)
p02=7.387e+06 (3.944e+06, 1.083e+07)

FIG. 9 is similar to FIG. 8 but for an offset launch r=7 μm, and shows the relationship between the $ROB_{7\mu m}$ (950 nm) (on the Yr-axis) and the $ROB_{7\mu m}$ (850 nm) (on the X-axis) and $ROD_{7\mu m}$ (850 nm)-$ROD_{6\mu m}$ (850 nm) (on the Xd-axis) of a tens of 50 μm graded-index multimode fibers.

The relative coupler power $\tilde{P}_{DMD}$ does not significantly change with the wavelength. Therefore, it is not necessary to transform it at step 520. However, applying a transformation to the relative coupler power $\tilde{P}_{DMD}$ to account for these slight changes with wavelength would not fall out of the scope of the present disclosure.

At step 530, the following transfer function $\tilde{H}$, called EMB equivalent, is computed:

$$\tilde{H}(f) = \sum_{r=0}^{r=a} P_{source}(r) \cdot \tilde{P}_{DMD}(r) \cdot OMBc(r) \cdot e^{-i2\pi(\widetilde{\Delta\tau}_{DMD}(r))f} \cdot e^{-\left(\frac{1}{\tilde{\sigma}_{DMD}(r)^2}\right)f^2}$$

with:

$$\widetilde{\Delta\tau}_{DMD}(r) = L \cdot ROD(r)$$

$$\frac{1}{\tilde{\sigma}_{DMD}(r)^2} = \left(\frac{L \cdot \sqrt{0.3 \log_e 10}}{ROB(r)}\right)^2$$

where a is the core radius of the fiber (e.g. 25 μm), $P_{source}(r)$ is the weight function of the sources, L is the length of said multimode fiber, and OMBc(r) is the OMBc (for "Overfilled Modal Bandwidth calculated") weight function.

The OMBc weight functions are the weight functions disclosed in "Calculated Modal Bandwidths of an OM4 Fiber and the Theoretical Challenges" by Abhijit Sengupta, International Wire & Cable Symposium, Proceedings of the 58$^{th}$ IWCS/IICIT, pp. 24-29.

It is possible to use the weight functions $P_{source}(r)$ reported in the standards TIA455-220A, and described in the tables 1 and 2 below, where the columns correspond to a laser ID, ranking from 1 to 10, and the lines correspond to the radial offset launch r, ranking from 0 to 25 μm.

The $P_{source}(r)$ functions, which are parameters characteristic of the VCSEL multimode transverse sources, may also be obtained as described in patent document WO2015056044, by:

exciting a nominal multimode fiber with the light source;
scanning with a single mode fiber an output signal of the nominal multimode fiber, at different radial offset values r, from an axis of the nominal fiber where r=0 to a radial offset value r=a, where a is the core radius of the nominal fiber, analyzing with a spectrum analyzer an output optical spectrum of the single mode fiber for each radial offset value r, in order to derive a curve showing an output power $P_{source}(r)$ of the source as a function of the radial offset value r, 0≤r≤a.

In other words, the source is characterized according to a process close to that of the DMD measurement process. A nominal multimode graded-index fiber, with a core showing a diameter of 50 μm, is first excited with the source to be characterized. Such a nominal multimode graded-index fiber has sensibly the same core diameter, numerical aperture and single alpha graded index profile as the multimode fiber 4 used in the link. A single mode fiber at $\lambda_2$=850 nm scans the output of the nominal fiber, in a manner similar to that used in the standard DMD measurements, thus preferably from 0 to 25 μm, with a 1-micron step. An optical spectrum analyzer placed at the output of the single mode fiber records the output optical spectrum for each position of the SMF.

Without lack of generality, the single mode fiber used for the source characterization may be the same as the single mode fiber 10 used in the DMD measurement.

Usually, we use, as EMB, 1.13 times the minimum EMB obtained with this set of ten weight functions, meaning we compute the −3 dB bandwidths of the transfer function $\tilde{H}$ for every of the ten weight functions $P_{source}(r)$ reported in the standards TIA455-220A, and calculate the EMB at the minimum among the ten obtained bandwidths times 1.13.

TABLE 1

| | Laser ID | | | | |
|---|---|---|---|---|---|
| r | 1 | 2 | 3 | 4 | 5 |
| 0 | 0 | 0 | 0 | 0 | 0 |
| 1 | 0.033023 | 0.023504 | 0 | 0 | 0 |
| 2 | 0.262463 | 0.188044 | 0 | 0 | 0 |
| 3 | 0.884923 | 0.634634 | 0 | 0 | 0 |
| 4 | 2.009102 | 1.447235 | 0.007414 | 0.005637 | 0.003034 |
| 5 | 3.231216 | 2.376616 | 0.072928 | 0.055488 | 0.029856 |
| 6 | 3.961956 | 3.052908 | 0.262906 | 0.20005 | 0.107634 |
| 7 | 3.694686 | 3.150634 | 0.637117 | 0.483667 | 0.258329 |
| 8 | 2.644369 | 2.732324 | 1.197628 | 0.89695 | 0.458494 |
| 9 | 1.397552 | 2.060241 | 1.916841 | 1.402833 | 0.661247 |
| 10 | 0.511827 | 1.388339 | 2.755231 | 1.957805 | 0.826035 |
| 11 | 0.110549 | 0.834722 | 3.514797 | 2.433247 | 1.000204 |
| 12 | 0.004097 | 0.419715 | 3.883317 | 2.639299 | 1.294439 |
| 13 | 4.79E−05 | 0.160282 | 3.561955 | 2.397238 | 1.813982 |
| 14 | 0.001111 | 0.047143 | 2.617093 | 1.816953 | 2.50695 |
| 15 | 0.005094 | 0.044691 | 1.480325 | 1.296977 | 3.164213 |
| 16 | 0.013918 | 0.116152 | 0.593724 | 1.240553 | 3.572113 |
| 17 | 0.02632 | 0.219802 | 0.153006 | 1.70002 | 3.618037 |
| 18 | 0.036799 | 0.307088 | 0.012051 | 2.240664 | 3.329662 |
| 19 | 0.039465 | 0.329314 | 0 | 2.394077 | 2.745395 |
| 20 | 0.032152 | 0.268541 | 0 | 1.952429 | 1.953241 |
| 21 | 0.019992 | 0.16697 | 0 | 1.213833 | 1.137762 |
| 22 | 0.008832 | 0.073514 | 0 | 0.534474 | 0.494404 |
| 23 | 0.002612 | 0.021793 | 0 | 0.158314 | 0.146517 |
| 24 | 0.000282 | 0.002679 | 0 | 0.019738 | 0.018328 |
| 25 | 0 | 0 | 0 | 0 | 0 |

TABLE 2

| | Laser ID | | | | |
|---|---|---|---|---|---|
| r | 6 | 7 | 8 | 9 | 10 |
| 0 | 0 | 0 | 0 | 0 | 0 |
| 1 | 0.015199 | 0.016253 | 0.022057 | 0.01043 | 0.015681 |
| 2 | 0.12091 | 0.129011 | 0.17639 | 0.083496 | 0.124978 |
| 3 | 0.407702 | 0.434844 | 0.595248 | 0.281802 | 0.421548 |
| 4 | 0.925664 | 0.987184 | 1.351845 | 0.65028 | 0.957203 |
| 5 | 1.488762 | 1.5876 | 2.174399 | 1.130599 | 1.539535 |

TABLE 2-continued

| | | | Laser ID | | |
|---|---|---|---|---|---|
| r | 6 | 7 | 8 | 9 | 10 |
| 6 | 1.825448 | 1.946614 | 2.666278 | 1.627046 | 1.887747 |
| 7 | 1.302306 | 1.815285 | 2.486564 | 2.044326 | 1.762955 |
| 8 | 1.218378 | 1.299241 | 1.780897 | 2.29172 | 1.292184 |
| 9 | 0.643911 | 0.686635 | 0.945412 | 2.280813 | 0.790844 |
| 10 | 0.238557 | 0.25585 | 0.360494 | 1.937545 | 0.55938 |
| 11 | 0.098956 | 0.131429 | 0.163923 | 1.383006 | 0.673655 |
| 12 | 0.204274 | 0.327091 | 0.318712 | 0.878798 | 1.047689 |
| 13 | 0.529982 | 0.848323 | 0.778983 | 0.679756 | 1.589037 |
| 14 | 1.024948 | 1.567513 | 1.383174 | 0.81236 | 2.138626 |
| 15 | 1.611695 | 2.224027 | 1.853992 | 1.074702 | 2.470827 |
| 16 | 2.210689 | 2.55506 | 1.914123 | 1.257323 | 2.361764 |
| 17 | 2.707415 | 2.464566 | 1.511827 | 1.255967 | 1.798213 |
| 18 | 2.9388 | 2.087879 | 0.90833 | 1.112456 | 1.059264 |
| 19 | 2.73932 | 1.577111 | 0.386991 | 0.879309 | 0.444481 |
| 20 | 2.090874 | 1.056343 | 0.11176 | 0.608183 | 0.123304 |
| 21 | 1.261564 | 0.595102 | 0.014829 | 0.348921 | 0.012552 |
| 22 | 0.55214 | 0.256718 | 0.001818 | 0.15112 | 0 |
| 23 | 0.163627 | 0.076096 | 0.00054 | 0.044757 | 0 |
| 24 | 0.020443 | 0.009446 | 0 | 0.005639 | 0 |
| 25 | 0 | 0 | 0 | 0 | 0 |

Actually, the EMB of a multimode optical fiber can be fairly approximated by the −3 dB bandwidth of the $\tilde{H}$ transfer function, as illustrated by FIG. 10, which reports the EMB equivalent and the actual EMB calculated from a DMD plot performed at 850 nm of a set of 50 μm graded-index multimode-fibers. FIG. 10 confirms that the EMB equivalent calculated from the ROD, ROB and $P_{DMD}$ (shown on the y-axis, and expressed in MHz-km) is a fair approximation of the actual EMB of a multimode fiber (shown on the x-axis, and expressed in MHz-km) calculated according to TIA-455-220A, as illustrated by the continuous line which fairly approximates the distribution of the dots.

Since the EMB can be calculated from the ROB, ROD and $P_{DMD}$ data, extrapolating the EMB at other wavelengths can be obtained by extrapolating the ROB, ROD and $P_{DMD}$ data at these other wavelengths.

Therefore, at step 530, the EMB at the first wavelength $\lambda_1$=950 nm is calculated from:
the ROD data extrapolated at $\lambda_1$=950 nm as obtained at step 520;
the ROB data extrapolated at $\lambda_1$=950 nm as obtained at step 520;
the $P_{DMD}$ data at $\lambda_2$=850 nm as obtained at step 510.

At step 540, the −3 dB bandwidth of this $\tilde{H}(f)$ transfer function is computed. Of course, other ways of deriving EB from $\tilde{H}(f)$ could be used, such as by using a −1.5 dB threshold and multiplying the obtained bandwidth by √2, or by using a −6 dB threshold for example.

FIG. 11 illustrates the relationship between the equivalent EMB at $\lambda_1$=950 nm calculated at step 540 and the actual EMB obtained from actual DMD measurements at $\lambda_1$=950 nm for a batch of multimode optical fibers. The actual EMB of the multimode optical fibers calculated from actual DMD measurements at $\lambda_1$=950 nm is shown on the x-axis of FIG. 11, while the equivalent EMB of the same multimode optical fibers, as calculated through the process of FIG. 5, are shown on the y-axis of FIG. 11. Both EMB are expressed in MHz-km. The correspondence values between both EMB are shown as little circles, or dots, on FIG. 11, which are gathered in a cloud around a continuous line. Such a continuous line corresponds to a linear fit, showing that there is a fair linear relationship between the actual EMB derived from actual DMD measurements and the extrapolated EMB as obtained at step 540.

By observing FIG. 11, it can be deduced that, based on a single DMD measurement at 850 nm, the extrapolated equivalent EMB at 950 nm computed at step 540 is a good criterion to pre-select fibers that would offer the largest actual EMB at 950 nm.

Such a selection is performed at step 550. It may aim, for example, at selecting OM4 fibers showing an EMB at 950 nm higher than 2,700 MHz-km. As illustrated by the vertical and horizontal dashed lines on FIG. 11, multimode optical fibers showing an extrapolated EMB at 950 nm (as computed at step 540) higher than 1,800 MHz-km are likely to meet this performance criterion.

Step 550 may therefore consist in selecting all multimode optical fibers from the batch of fibers (as considered at the beginning of the process of FIG. 5), for which the bandwidth computed at step 540 is above 1,800 MHz-km. The manufacturer may then perform actual DMD measurements, and more generally performance measurements, at $\lambda_1$=950 nm, on, and only on, these selected fibers. The number of measurements at $\lambda_1$=950 nm that must be performed is hence strongly reduced, which allows great savings in measurement time.

Step 550 may also rely on the use of a probability law, derived from a sample of fibers, through a ratio of the number of fibers in the sample satisfying the performance criterion as compared to the number of fibers in the sample which don't fulfill the performance criterion. When a new fiber is tested, its extrapolated EMB is computed, as described in FIG. 5, and the likelihood this fiber fulfills the performance criterion is assessed, as a function of the probability law.

Depending on its measurement capacity, the manufacturer may then decide to carry actual DMD measurements at $\lambda_1$=950 nm, only for the fibers which probability is higher than 50%, or higher than 80% for example.

Step 550 hence allows the manufacturer to take a decision to achieve or not actual DMD measurements at $\lambda_1$=950 nm on the multimode optical fibers.

FIG. 12 is a schematic block diagram illustrating parts of a system for selecting multimode optical fibers meeting a given performance criterion, such as OM4 fibers showing an actual EMB at 950 nm higher than 2,700 MHz-km, according to an embodiment of the present disclosure.

Such a system comprises a bench bed for performing DMD measurements on multimode optical fibers, as illustrated by FIG. 2. It also comprises an apparatus 1200 illustrated in FIG. 12 comprising a processor 1201, a storage unit 1202, an input device 1203, an output device 1204, and an interface unit 1205 which are connected by a bus 1206. Of course, constituent elements of the computer apparatus 1200 may be connected by a connection other than a bus connection using the bus 1206.

The processor 1201 controls operations of the apparatus 1200. The storage unit 1202 stores at least one program to be executed by the processor 1201, and various data, including parameters used by computations performed by the processor 1201, such as the ROB, ROD and $P_{DMD}$ data computed either at step 510 or step 520, intermediate data of computations performed by the processor 1201, and so on. The processor 1201 may be formed by any known and suitable hardware, or software, or a combination of hardware and software. For example, the processor 1201 may be formed by dedicated hardware such as a processing circuit, or by a programmable processing unit such as a CPU (Central Processing Unit) that executes a program stored in a memory thereof.

The storage unit 1202 may be formed by any suitable storage or means capable of storing the program, data, or the like in a computer-readable manner. Examples of the storage unit 1202 include non-transitory computer-readable storage media such as semiconductor memory devices, and magnetic, optical, or magneto-optical recording media loaded into a read and write unit. The program causes the processor 1201 to perform a process for qualifying the effective bandwidth of multimode optical fibers and for selecting multimode optical fibers meeting a given performance criterion according to an embodiment of the present disclosure as described previously.

The input device 1203 may be formed by a keyboard, a pointing device such as a mouse, or the like for use by the user to input commands. The output device 1204 may be formed by a display device to display, for example, the ROB, ROD and $P_{DMD}$ curves derived from the DMD plot or transformed at step 520, or the value of the extrapolated EMB bandwidth of the fiber at 950 nm. The input device 1203 and the output device 1204 may be formed integrally by a touchscreen panel, for example. The input device 1203 may be used by an operator for selecting a threshold for the extrapolated EMB bandwidth at 950 nm, corresponding to the performance criterion that the fibers must meet, or for selecting the values of the wavelengths $\lambda_1$ and $\lambda_2$. Such values may then be stored into storage unit 1202.

The interface unit 1205 provides an interface between the apparatus 1200 and an external apparatus, such as the bench bed (not illustrated on FIG. 12). The interface unit 1205 may be communicable with the external apparatus via cable or wireless communication.

Although only one processor 1201 is shown on FIG. 12, it must be understood that such a processor may comprise different modules and units embodying the functions carried out by apparatus 1200 according to embodiments of the present disclosure, such as:

- a module for determining the ROD, ROB and $P_{DMD}$ data at $\lambda_1 = 950$ nm from the DMD data at $\lambda_2 = 850$ nm;
- a module for performing a transformation on the ROD data and ROB data at $\lambda_2 = 850$ nm to obtain corresponding ROD data and ROB data at $\lambda_1 = 950$ nm;
- a module for computing the effective bandwidth of the multimode optical fiber at $\lambda_1$, and for calculating a transfer function using the ROD data and ROB data at $\lambda_1$ and the $\tilde{P}_{DMD}$ data at $\lambda_2$;
- a module for assessing, for each multimode optical fiber, a probability that it fulfills a performance criteria at $\lambda_1$ (for example EMB>2,700 MHz-km) on the basis of the computed effective bandwidth at $\lambda_1$;
- a module for selecting at least one multimode optical fiber, which probability is higher than a probability threshold set by the user.

These modules and units may also be embodied in several processors 1201 communicating and co-operating with each other.

The invention claimed is:

1. A method of qualifying an effective bandwidth of a multimode optical fiber at a first wavelength $\lambda_1$, comprising:
   obtaining DMD data using a measurement of dispersion modal delay (DMD) carried out on said multimode optical fiber at a second wavelength $\lambda_2$, said DMD data comprising a plurality of traces recorded at different radial offset values r, from an axis of said multimode optical fiber where r=0 to a radial offset value r=a, where a is the core radius of said multimode optical fiber, wherein said method also comprises:
   determining, from said DMD data at said second wavelength $\lambda_2$:
      Data representative of a Radial Offset Delay of said multimode optical fiber, called ROD data, as a function of said radial offset value r, $0 \leq r \leq a$;
      Data representative of a Radial Offset Bandwidth of said multimode optical fiber, called ROB data, as a function of said radial offset value r, $0 \leq r \leq a$;
      Data representative of a Relative Radial Coupled Power of said multimode optical fiber, called $\tilde{P}_{DMD}$ data, as a function of said radial offset value r, $0 \leq r \leq a$;
   performing a transformation on the ROD data and ROB data at said second wavelength $\lambda_2$ to obtain corresponding ROD data and ROB data at said first wavelength $\lambda_1$;
   computing an effective bandwidth of said multimode optical fiber at said first wavelength $\lambda_1$, comprising calculating a transfer function using said ROD data and said ROB data at said first wavelength $\lambda_1$ and said $\tilde{P}_{DMD}$ data at said second wavelength $\lambda_2$.

2. The method of claim 1, wherein performing a transformation on the ROD data at said second wavelength $\lambda_2$ to obtain said corresponding ROD data at said first wavelength $\lambda_1$ comprises applying the following linear function:
$$ROD_r(\lambda_1) = p_{1,r}^{\lambda_2 \to \lambda_2} \cdot ROD_r(\lambda_2) + p_{2,r}^{\lambda_2 \to \lambda_1},$$
where and $p_{1,r}$ and $p_{2,r}$ are scalars.

3. The method of claim 1, wherein performing a transformation on the ROB data at said second wavelength $\lambda_2$ to obtain said corresponding ROB data at said first wavelength $\lambda_1$ comprises applying the following formula:

$$ROB_r(\lambda_1) = p_{00,r}^{\lambda_2 \to \lambda_1} + p_{10,r}^{\lambda_2 \to \lambda_{21}} \cdot ROB_r(\lambda_2) + p_{01,r}^{\lambda_2 \to \lambda_1} \cdot \frac{dROD_r}{dr}(\lambda_2) + p_{11,r}^{\lambda_2 \to \lambda_1} \cdot ROB_r(\lambda_2) \cdot \frac{dROD_r}{dr}(\lambda_2) + p_{02,r}^{\lambda_2 \to \lambda_1} \cdot \left[\frac{dROD_r}{dr}(\lambda_2)\right]^2,$$

where $P_{00,r}, P_{10,r}, P_{01,r}, P_{11,r}$ and $P^{02,r}$ are scalars.

4. The method of claim 3, wherein $$\frac{dROD_r}{dr}(\lambda_2) = ROD_r(\lambda_2) - ROD_{r-1\mu m}(\lambda_2) \text{ for}$$

$$r > 1 \ \mu m \text{ and } \frac{dROD_r}{dr}(\lambda_2) = 0 \text{ for } r < 1 \ \mu m.$$

5. The method of claim 1, wherein computing said effective bandwidth of said multimode optical fiber at said first wavelength $\lambda_1$ comprises calculating a transfer function $\tilde{H}(f)$, where:

$$\tilde{H}(f) = \sum_{r=0}^{r=a} W(r) \cdot \tilde{P}_{DMD}(r) \cdot e^{-i2\pi(\widetilde{\Delta\tau}_{DMD}(r))f} \cdot e^{-\left(\frac{1}{\tilde{\sigma}_{DMD}(r)^2}\right)f^2}$$

with:

$$\widetilde{\Delta\tau}_{DMD}(r) = L \cdot ROD(r)$$

$$\frac{1}{\tilde{\sigma}_{DMD}(r)^2} = \left(\frac{L \cdot \sqrt{0.3 \log_e 10}}{ROB(r)}\right)^2$$

where
W(r) is a weight function, with $\Sigma_{r=0}^{r=a} W(r) > 0$ and W(r)>0 at any r, and
L is the length of said multimode fiber.

6. The method of claim 1, wherein computing said effective bandwidth of said multimode optical fiber at said first wavelength $\lambda_1$ comprises calculating a transfer function $\tilde{H}(f)$, where:

$$\tilde{H}(f) = \sum_{r=0}^{r=a} P_{source}(r) \cdot \tilde{P}_{DMD}(r) \cdot OMBc(r) \cdot e^{-i2\pi(\tilde{\Delta\tau}_{DMD}(r))f} \cdot e^{-\left(\frac{1}{\tilde{\sigma}_{DMD}(r)^2}\right)f^2}$$

with:

$$\tilde{\Delta\tau}_{DMD}(r) = L \cdot ROD(r)$$

$$\frac{1}{\tilde{\sigma}_{DMD}(r)^2} = \left(\frac{L \cdot \sqrt{0.3 \log_e 10}}{ROB(r)}\right)^2$$

where
$P_{source}(r)$ is a function representative of the output power of a source as a function of a radial offset value r of a single mode fiber at the output of said multimode optical fiber, with $\Sigma_{r=0}^{r=a} P_{source}(r) > 0$ and $P_{source}(r) > 0$ at any r,
L is the length of said multimode fiber,
and OMBc(r) is the OMBc (for "Overfilled Modal Bandwidth calculated") weight function.

7. The method of claim 5, wherein said effective bandwidth of said multimode optical fiber is a −3 dB bandwidth of said $\tilde{H}(f)$ transfer function.

8. The method of claim 1, wherein said first wavelength $\lambda_1$=950 nm and said second wavelength $\lambda_2$=850 nm.

9. A computer program product downloadable from a communication network and/or recorded on a medium readable by a computer and/or executable by a processor, comprising program code instructions for implementing a method according to claim 1.

10. A non-transitory computer-readable medium comprising a computer program product recorded thereon and capable of being run by a processor, including program code instructions for implementing a method according to claim 1.

11. A method of selecting at least one multimode optical fiber, which is likely to meet a first performance criteria at a first wavelength $\lambda_1$, comprising:

selecting a set of multimode optical fibers meeting a second performance criteria at a second wavelength $\lambda_2$;

qualifying an effective modal bandwidth of said set of multimode optical fibers in compliance with the method of any of claims 1 to 7, delivering an effective bandwidth of said set of multimode optical fibers at said first wavelength $\lambda_1$;

on the basis of said effective bandwidth at said first wavelength $\lambda_1$, assessing, for each multimode optical fiber in said set, a probability that said multimode optical fiber fulfills said performance criteria at the first wavelength $\lambda_1$;

selecting in said set at least one multimode optical fiber, which probability is higher than a probability threshold.

12. The method of claim 11, wherein said second performance criteria is that the Effective Modal Bandwidth at a second wavelength $\lambda_2$=850 nm is equal or higher than 4,700 MHz-km, and wherein said first performance criteria is that the Effective Modal Bandwidth at a first wavelength $\lambda_1$=950 nm is equal or higher than 2,700 MHz-km.

13. A system for selecting at least one multimode optical fiber, which is likely to meet a first performance criteria at a first wavelength $\lambda_1$, comprising:

a bench bed configured for selecting a set of multimode optical fibers meeting a second performance criteria at a second wavelength $\lambda_2$;

a processor configured for:
qualifying an effective modal bandwidth of said set of multimode optical fibers in compliance with the method of any of claims 1 to 8, delivering an effective bandwidth of said set of multimode optical fibers at said second wavelength $\lambda_2$;

on the basis of said effective bandwidth at said first wavelength $\lambda_1$, assessing, for each multimode optical fiber in said set, a probability that said multimode optical fiber fulfills said performance criteria at the first wavelength $\lambda_1$;

selecting in said set at least one multimode optical fiber, which probability is higher than a probability threshold.

14. A computer program product downloadable from a communication network and/or recorded on a medium readable by a computer and/or executable by a processor, comprising program code instructions for implementing a method according to claim 11.

15. A non-transitory computer-readable medium comprising a computer program product recorded thereon and capable of being run by a processor, including program code instructions for implementing a method according to claim 11.

* * * * *